(12) United States Patent
Ikeuchi et al.

(10) Patent No.: US 10,915,005 B2
(45) Date of Patent: Feb. 9, 2021

(54) VIBRATING DEVICE, METHOD FOR DRIVING SAME, AND CAMERA

(71) Applicant: Murata Manufacturing Co., Ltd., Nagaokakyo (JP)

(72) Inventors: Shinsuke Ikeuchi, Nagaokakyo (JP); Katsumi Fujimoto, Nagaokakyo (JP); Masanobu Nomura, Nagaokakyo (JP); Kenji Nishiyama, Nagaokakyo (JP)

(73) Assignee: Murata Manufacturing Co., Ltd., Kyoto (JP)

(*) Notice: Subject to any disclaimer, the term of this patent is extended or adjusted under 35 U.S.C. 154(b) by 491 days.

(21) Appl. No.: 15/960,666

(22) Filed: Apr. 24, 2018

(65) Prior Publication Data

US 2018/0239218 A1    Aug. 23, 2018

Related U.S. Application Data

(63) Continuation of application No. PCT/JP2016/086933, filed on Dec. 12, 2016.

(30) Foreign Application Priority Data

Dec. 24, 2015   (JP) ................................ 2015-251914

(51) Int. Cl.
*G02B 27/00* (2006.01)
*G03B 5/00* (2021.01)
(Continued)

(52) U.S. Cl.
CPC .......... *G03B 5/00* (2013.01); *G02B 27/0006* (2013.01); *G03B 17/02* (2013.01); *G03B 17/08* (2013.01);
(Continued)

(58) Field of Classification Search
CPC .... G02B 27/0006; H02N 2/002; G03B 17/02; G03B 17/08; G03B 2205/0061; B06B 3/00; B06B 3/02; H04N 5/2252
(Continued)

(56) References Cited

U.S. PATENT DOCUMENTS

| 2004/0227837 | A1  | 11/2004 | Ito |
| 2012/0243093 | A1* | 9/2012  | Tonar ................... G03B 17/08 |
|              |     |         | 359/507 |
| 2014/0033454 | A1  | 2/2014  | Koops et al. |

FOREIGN PATENT DOCUMENTS

| JP | 03-244281 A  | 10/1991 |
| JP | 05-32191 U   | 4/1993  |

(Continued)

OTHER PUBLICATIONS

Official Communication issued in International Patent Application No. PCT/JP2016/086933, dated Feb. 28, 2017.

*Primary Examiner* — Clayton E. LaBalle
*Assistant Examiner* — Fang-Chi Chang
(74) *Attorney, Agent, or Firm* — Keating & Bennett, LLP

(57) ABSTRACT

A vibrating device includes a tubular vibrating body and a lens cover coupled to a first surface of the tubular vibrating body. The tubular vibrating body includes a tubular member and piezoelectric vibrators. The lens cover includes a mode changing coupler and a light transmitting body unit disposed in front of a lens of a camera. The mode changing coupler includes a thin portion having a thickness smaller than a thickness of the tubular member.

18 Claims, 13 Drawing Sheets

(51) Int. Cl.
 *G03B 17/08* (2021.01)
 *H04N 5/225* (2006.01)
 *G03B 17/02* (2021.01)
 *H02N 2/00* (2006.01)
 *H04N 5/232* (2006.01)

(52) U.S. Cl.
 CPC ......... *H02N 2/002* (2013.01); *H04N 5/22521* (2018.08); *G03B 2205/0061* (2013.01); *H04N 5/23216* (2013.01); *H04N 5/23287* (2013.01); *H04N 5/23296* (2013.01)

(58) Field of Classification Search
 USPC .......................................... 396/448; 359/511
 See application file for complete search history.

(56) References Cited

FOREIGN PATENT DOCUMENTS

| | | | |
|---|---|---|---|
| JP | 2004-253873 | A | 9/2004 |
| JP | 2007-082062 | A | 3/2007 |
| JP | 2011-125815 | A | 6/2011 |
| JP | 2012-138768 | A | 7/2012 |
| JP | 2013-080177 | A | 5/2013 |

* cited by examiner

0Vp-p

4Vp-p

10Vp-p

16Vp-p

VIBRATING DEVICE, METHOD FOR DRIVING SAME, AND CAMERA

CROSS REFERENCE TO RELATED APPLICATIONS

This application claims the benefit of priority to Japanese Patent Application No. 2015-251914 filed on Dec. 24, 2015 and is a Continuation Application of PCT Application No. PCT/JP2016/086933 filed on Dec. 12, 2016. The entire contents of each application are hereby incorporated herein by reference.

BACKGROUND OF THE INVENTION

1. Field of the Invention

The present invention relates to a vibrating device including a piezoelectric vibrator, a method for driving the vibrating device, and a camera.

2. Description of the Related Art

Monitoring devices, such as cameras, are required to have a constantly clear field of view. In particular, for outdoor cameras, such as car-mounted cameras, various mechanisms for removing water droplets, such as raindrops, have been proposed. Japanese Unexamined Patent Application Publication No. 2012-138768 describes a camera with a raindrop-removing function including a dome-shaped cover disposed in front of a camera main body. The dome-shaped cover is coupled to a cylindrical portion. A piezoelectric vibrator is fixed to an inner side surface of the cylindrical portion. The piezoelectric vibrator vibrates the cylindrical portion and the dome-shaped cover. Thus, raindrops on the dome-shaped cover are removed. According to Japanese Unexamined Patent Application Publication No. 2012-138768, vibration nodes of the dome-shaped cover can be changed by changing the applied frequency, so that the positions from which the raindrops are removed can be changed.

Japanese Unexamined Patent Application Publication No. 2007-82062 describes a camera with a raindrop removing function including a piezoelectric vibrator, an adhesive, and an outer lens disposed in front of a camera main body. When raindrops adhere to the outer lens, an ultrasonic transducer is driven to vibrate the outer lens. The raindrops are removed or atomized into mist that dissipates due to the vibration.

In the structures described in Japanese Unexamined Patent Application Publication No. 2012-138768 and Japanese Unexamined Patent Application Publication No. 2007-82062, the piezoelectric vibrator is driven to remove the raindrops by causing the dome-shaped cover or the outer lens to mechanically resonate. The water droplets evaporate from liquid to gas due to the mechanical resonance, and are thereby removed. However, in the above-described water-droplet-removing method using the mechanical resonance, the dome-shaped cover or the outer lens always has portions that define vibration nodes. Therefore, there is a problem in that the water droplets cannot be removed from the portions that define the vibration nodes.

To solve this problem, according to Japanese Unexamined Patent Application Publication No. 2012-138768, for example, the vibration mode is changed to change the positions of the vibration nodes. However, when the water droplets on the dome-shaped cover are in a region within the field of view of the camera, there is a risk that the field of view of the camera will become unclear due to the mist generated when the water droplets are removed. In addition, there is also a risk that residue of the water droplets will remain on the dome-shaped cover or the outer lens at positions at which the water droplets are atomized. Thus, even when the water droplets can be removed from the portions that define the vibration nodes, the clarity of the field of view of the camera cannot always be improved. Furthermore, substances to be removed include not only water droplets but also solutions other than water, such as ethanol, aqueous solutions of salt, an antifreezing agent (calcium chloride), etc., droplets of liquid containing water insoluble impurities, such as mud water, and colloidal solutions, such as coffee.

SUMMARY OF THE INVENTION

Preferred embodiments of the present invention provide vibrating devices and cameras capable of removing water droplets or other substances from a dome-shaped cover or an outer lens and maintaining the clarity of the field of view of the camera. In addition, preferred embodiments of the present invention provide methods for driving a vibrating device capable of removing water droplets or other substances from a dome-shaped cover or an outer lens and maintaining the clarity of the field of view of a camera.

According to a preferred embodiment of the present invention, a vibrating device for a camera including a lens includes a tubular vibrating body and a lens cover. The tubular vibrating body includes a first surface, a second surface that is opposite the first surface, and a side wall portion that connects the first and second surfaces. The first and second surfaces include openings. The lens cover covers one of the openings in the tubular vibrating body. The tubular vibrating body includes a tubular member and a piezoelectric vibrator fixed to the tubular member. The lens cover includes a tubular mode changing coupler coupled to the tubular vibrating body and a light transmitting body unit joined to the mode changing coupler at a side opposite to a side at which the tubular vibrating body is coupled. The light transmitting body unit includes a light transmitting portion disposed in front of the lens. The mode changing coupler includes a thin portion having a thickness smaller than a thickness of the tubular member.

In a vibrating device according to a preferred embodiment of the present invention, when the tubular vibrating body is vibrated, the tubular vibrating body vibrates the light transmitting body unit in a first vibration mode in which the light transmitting body unit has a vibration node in a first region of the light transmitting body unit, the first region corresponding to a field-of-view section of the camera, and a vibration antinode in a second region of the light transmitting body unit, the second region being positioned outside the field-of-view section of the camera.

In a vibrating device according to a preferred embodiment of the present invention, a plurality of the piezoelectric vibrators are arranged in a circumferential direction of the tubular member so that the light transmitting body unit includes a plurality of vibration regions when the tubular vibrating body is vibrated, and that among the vibration regions, vibration regions that are adjacent to each other vibrate in opposite phases.

In a vibrating device according to a preferred embodiment of the present invention, the piezoelectric vibrator is arranged so as to extend in a circumferential direction of the tubular member and polarized in a thickness direction of the piezoelectric vibrator non-uniformly in the circumferential direction so that the light transmitting body unit includes a plurality of vibration regions when the tubular vibrating body is vibrated, and that among the vibration regions, vibration regions that are adjacent to each other vibrate in opposite phases.

In a vibrating device according to a preferred embodiment of the present invention, when the lens of the camera is viewed from the light transmitting body unit in the first vibration mode, a node of the first vibration mode is positioned on the light transmitting body unit in a region that overlaps the lens. In this case, a water droplet or other substance that has adhered to the light transmitting body unit in the region that overlaps the lens is able to be more reliably moved out of the first region of the light transmitting body unit that corresponds to the field-of-view section of the camera, and the clarity of the field of view of the camera is able to be maintained.

In a vibrating device according to a preferred embodiment of the present invention, the tubular vibrating body vibrates the light transmitting body unit in a second vibration mode in which a water droplet or other substance is atomized in the second region of the light transmitting body unit. In this case, when the water droplet or other substance that has been moved is atomized in the region outside the field-of-view section, the clarity of the field of view of the camera is able to be maintained even before the atomization.

In a vibrating device according to a preferred embodiment of the present invention, an amplitude in the second vibration mode is greater than an amplitude in the first vibration mode. In this case, the water droplet or other substance is able to be more reliably atomized.

In a vibrating device according to a preferred embodiment of the present invention, the lens cover and the lens may be spaced from each other.

A camera according to a preferred embodiment of the present invention includes a camera main body including a lens module and a vibrating device according to a preferred embodiment of the present invention. The lens module is disposed in the lens cover.

Another camera according to a preferred embodiment of the present invention includes a camera main body including a lens module including a lens positioned at a front end; and a tubular vibrating body coupled to the lens module and including a tubular piezoelectric vibrator and first and second surfaces that oppose each other. The tubular piezoelectric vibrator includes a plurality of vibration regions arranged in a circumferential direction thereof and is structured so that among the vibration regions, vibration regions that are adjacent to each other vibrate in opposite phases. When the tubular vibrating body is vibrated, the tubular vibrating body vibrates the lens module in a first vibration mode in which the lens positioned at the front end has a vibration node in a first region of the lens, the first region corresponding to a field-of-view section of the camera, and a vibration antinode in a second region of the lens, the second region being positioned outside the field of view of the camera.

According to a preferred embodiment of the present invention, a method for driving a vibrating device according to a preferred embodiment of the present invention includes a step of moving a water droplet or other substance that has adhered to the light transmitting body unit in the first region to the second region outside the field-of-view section of the camera by vibrating the light transmitting body unit in the first vibration mode; and a step of atomizing the water droplet moved to the second region of the light transmitting body unit.

In a method according to a preferred embodiment of the present invention, in the atomizing step, the water droplet or other substance moved to the second region of the light transmitting body unit is atomized by vibrating the light transmitting body unit in the second vibration mode. In this case, the water droplet or other substance is able to be more quickly moved toward the second region of the light transmitting body unit, and the clarity of the field of view of the camera is able to be maintained.

With the vibrating devices, the methods for driving the driving method, and the cameras according to preferred embodiments of the present invention, the water droplet or other substance that has adhered to the lens cover or the lens exposed to the outside of the lens module is able to be moved out of the first region of the light transmitting body unit that corresponds to the field-of-view section of the camera. Then, removal of the water droplet or other substance is performed in the second region of the light transmitting body unit that corresponds to the region outside the field-of-view section of the camera. Thus, the water droplet or other substance is able to be removed from the dome-shaped cover or the outer lens, and the clarity of the field of view of the camera is able to be maintained.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 1 is a front sectional view of a camera including a vibrating device according to a first preferred embodiment of the present invention.

FIG. 2 is a perspective view illustrating the vibrating device according to the first preferred embodiment of the present invention.

FIGS. 3A to 3D are schematic plan views of a light transmitting body unit viewed from the side at which water droplets or other substances adhere, illustrating vibration modes of the light transmitting body unit.

FIG. 4A is a perspective view of a tubular piezoelectric vibrator according to the first preferred embodiment of the present invention, and FIG. 4B is a sectional view of FIG. 4A taken along line X-X.

FIGS. 5A and 5B are schematic plan views illustrating the structures of the tubular piezoelectric vibrator in which regions adjacent to each other in the circumferential direction are polarized in opposite directions.

FIGS. 6A and 6B are plan views of the tubular piezoelectric vibrator, illustrating examples of electrode arrangements for driving regions adjacent to each other in the circumferential direction in opposite phases.

FIGS. 7A to 7E are schematic diagrams illustrating the steps by which a water droplet or other substance on the light transmitting body unit moves out of a region corresponding to a field-of-view section of the camera and is removed by being atomized in the first preferred embodiment of the present invention.

FIGS. 8A to 8C are schematic front views illustrating the steps by which a water droplet or other substance moves in a first vibration mode.

FIG. 9 is a front sectional view of a camera including a vibrating device according to a second preferred embodiment of the present invention.

FIG. 10 is a front sectional view illustrating a lens cover and a piezoelectric vibrator according to a third preferred embodiment of the present invention.

DETAILED DESCRIPTION OF THE PREFERRED EMBODIMENTS

The present invention will be clarified from the following description of preferred embodiments of the present invention with reference to the accompanying drawings.

It is to be noted that each of the preferred embodiments described in this specification is illustrative, and partial replacements and combinations of the structures of different preferred embodiments are possible.

Figure 1:
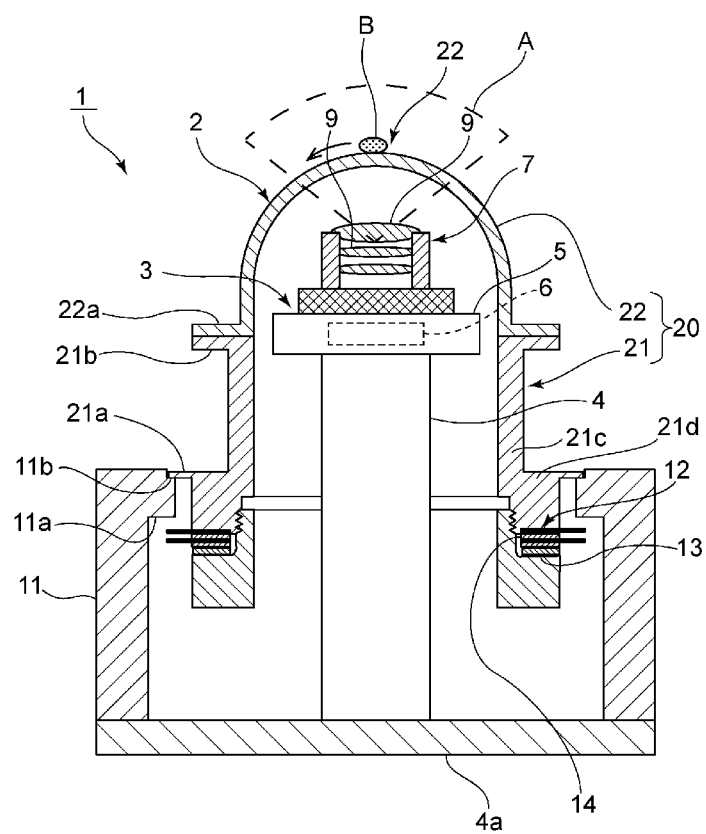
Figure 2:
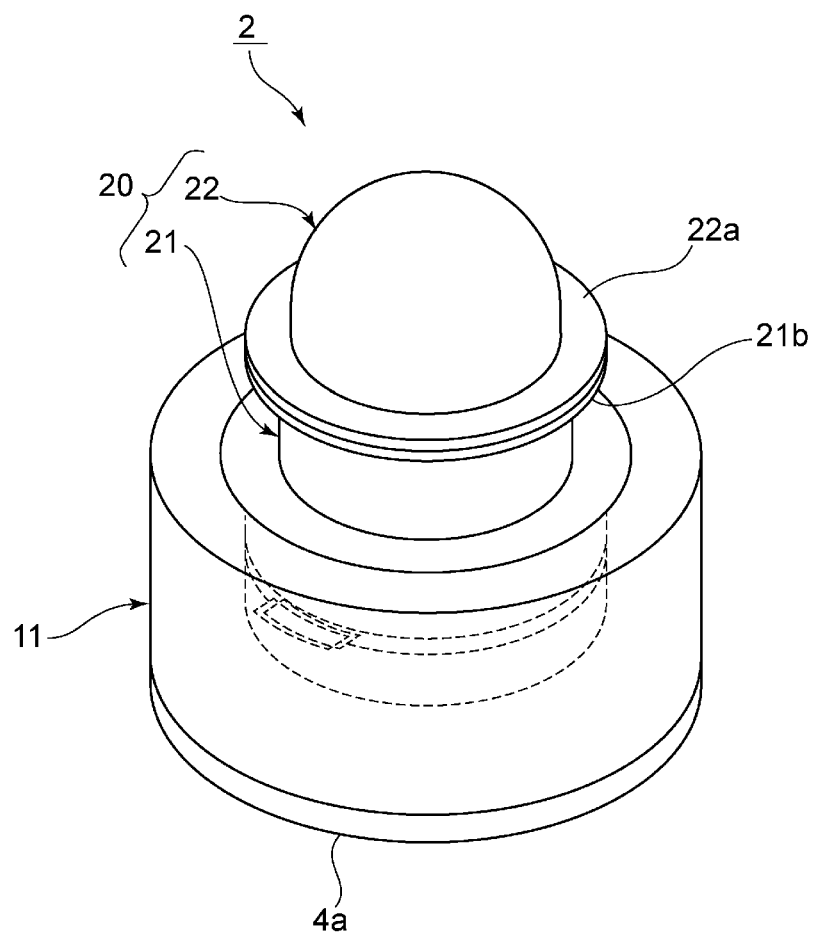

FIG. 1 is a front sectional view of a camera including a vibrating device according to a first preferred embodiment of the present invention. FIG. 2 is an exploded perspective view of the vibrating device. A camera 1 includes a vibrating device 2. The vibrating device 2 houses a camera main body 3.

The camera main body 3 includes a tubular main body member 4. The bottom end of the main body member 4 is fixed to a base plate 4a. An imaging unit 5 is fixed to the top end of the main body member 4. A circuit 6 including an imaging device is mounted in the imaging unit 5. A lens module 7 opposes the imaging unit 5. The lens module 7 is preferably tubular, and includes a plurality of lenses 9 therein.

The structure of the camera main body 3 is not particularly limited as long as the camera main body 3 is capable of capturing an image of an object in front of the lenses 9.

The vibrating device 2 includes a tubular casing member 11. In the present preferred embodiment, the tubular casing member is preferably cylindrical or substantially cylindrical, for example. The casing member 11 may instead have another shape, such as a rectangular or substantially rectangular tubular shape, for example. The casing member 11 is preferably made of, for example, a metal or synthetic resin.

The bottom end of the casing member 11 is fixed to the base plate 4a. An annular projection 11a that projects radially inward is provided at the top end of the casing member 11. An annular recess 11b is provided in the top surface of the projection 11a.

A tubular vibrating body 12 is fixed to the casing member 11. The tubular vibrating body 12 is preferably, for example, a Langevin vibrator. More specifically, preferably, the tubular vibrating body 12 includes two tubular piezoelectric vibrators 14 that are sandwiched between a tubular member 13 made of, for example, a metal plate and a mode changing coupler 21 made of, for example, a metal plate. Electrode lead-out portions extend from both principal surfaces of one of the tubular piezoelectric vibrators 14. The tubular vibrating body 12 includes a first surface and a second surface that oppose each other.

Figure 4A:
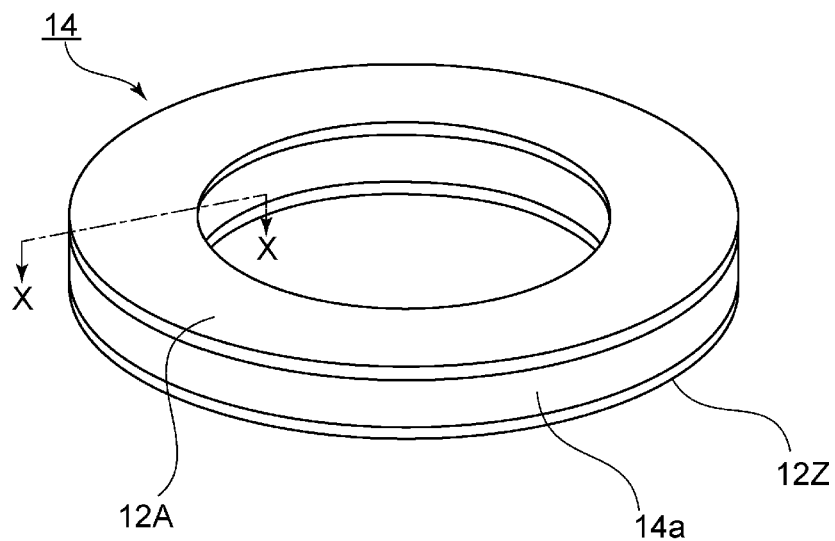
Figure 4B:
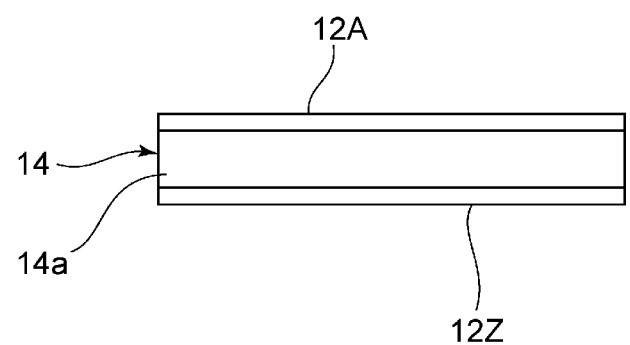
Figure 5A:
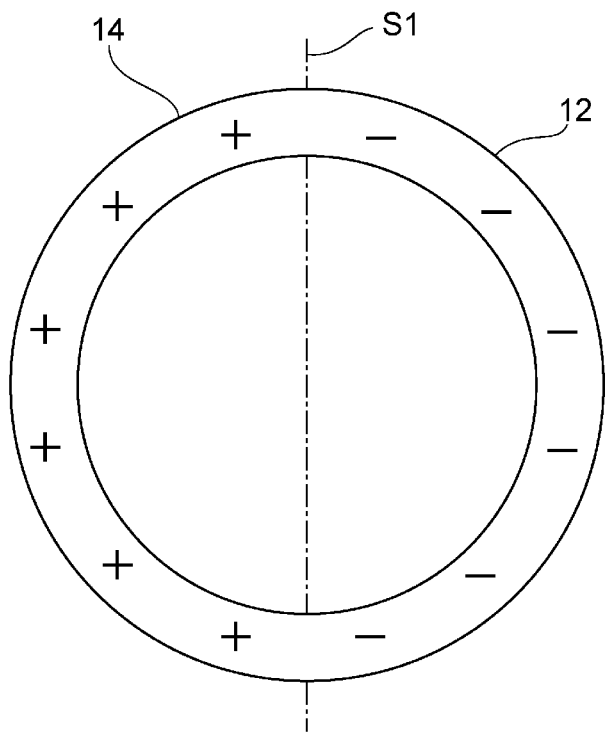

As illustrated in FIGS. 4A and 4B, each piezoelectric vibrator 14 includes a piezoelectric body layer 14a. An electrode 12A is provided on the top surface of the piezoelectric body layer 14a over the entire or substantially the entire area thereof. An electrode 12Z is provided on the bottom surface of the piezoelectric body layer 14a over the entire or substantially the entire area thereof. The tubular piezoelectric body layer 14a is polarized as illustrated in FIG. 5A. In FIG. 5A, + and − indicate that the piezoelectric body layer 14a is polarized in opposite thickness directions. The tubular vibrating body 12 may be structured to include only the piezoelectric vibrator 14.

A lens cover 20 is coupled to the first surface of the tubular vibrating body 12. The lens cover 20 includes the mode changing coupler 21 and a light transmitting body unit 22. The lens cover 20 accommodates the camera main body 3 therein.

One end of the mode changing coupler 21 is coupled to the tubular vibrating body 12. The light transmitting body unit 22 is coupled to the other end of the mode changing coupler 21. The mode changing coupler 21 includes a thin portion 21c and a thick portion 21d. The thin portion 21c is thinner than the thick portion 21d. When vibration generated by the tubular vibrating body 12 is transmitted to the light transmitting body unit 22, the mode changing coupler 21 changes the vibration mode and amplifies the vibration. The amplifying function is provided by the thin portion 21c.

The mode changing coupler 21 is structured such that the vibration mode is changed and the amplitude is increased by the mode changing coupler 21 when the vibration of the tubular vibrating body 12 is transmitted to the mode changing coupler 21.

The mode changing coupler 21 may have any appropriate shape as long as the functions of changing the vibration mode and increasing the amplitude are provided. In the present preferred embodiment, preferably, the mode changing coupler 21 is cylindrical or substantially cylindrical, and includes a flange portion 21a at one end and a flange portion 21b at the other end. The mode changing coupler 21 also includes the thin portion 21c and the thick portion 21d. The thin portion 21c is thinner than the thick portion 21d. A flange portion 22a of the light transmitting body unit 22 is fixed to the flange portion 21b.

The light transmitting body unit 22 is preferably made of a light transmitting material, such as glass or a synthetic resin, for example. The light transmitting body unit 22 includes a portion positioned in front of one of the lenses 9 that is at the front end of the camera main body 3. In FIG. 1, the broken line A indicates a section corresponding to the field of view of the imaging device included in the camera main body 3. Thus, a region surrounded by the portions at which the broken line A intersects the outer surface of the light transmitting body unit 22 defines a first region of the light transmitting body unit 22, the first region corresponding to a field-of-view section.

The camera 1 according to the present preferred embodiment includes the vibrating device 2 including the tubular vibrating body 12 and the lens cover 20.

The operation of the vibrating device according to the present preferred embodiment will now be described.

FIGS. 3A to 3D are schematic diagrams illustrating the displacements of the light transmitting body unit 22 when the light transmitting body unit 22 is vibrated in different vibration modes. FIGS. 3A to 3D illustrate the displacements of the light transmitting body unit 22 during vibration when viewed from the side at which water droplets or other substances adhere.

Referring to FIGS. 3A to 3D, the regions hatched with oblique lines and the blank white regions are displaced in opposite phases. In FIGS. 3A to 3D, the outermost periphery and the boundaries between the blank white regions and the regions hatched with oblique lines define vibration nodes. Therefore, in FIG. 3B, for example, the outermost periphery and the outer periphery of the circle hatched with oblique lines define the vibration nodes. In addition, the central section of the region shaded with oblique lines that is surrounded by the vibration nodes and the middle section of the blank white region that is located between the vibration nodes define vibration antinodes.

Figure 3A:
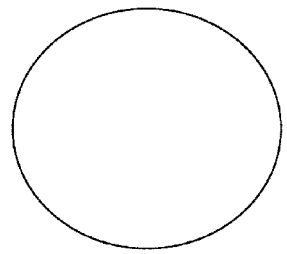
Figure 3B:
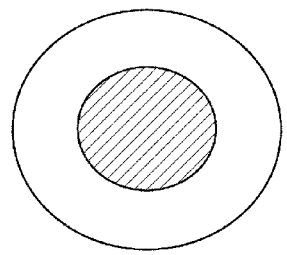
Figure 3C:
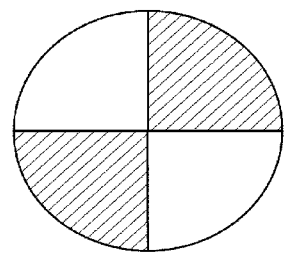
Figure 3D:
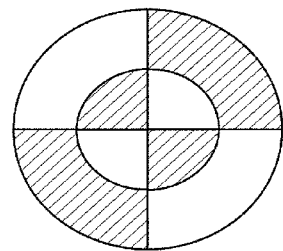

Referring to the schematic diagrams of FIGS. 3A to 3D, a mechanical resonance mode of a circular member is expressed as (m,n) mode, where m is the number of lines of nodes that are provided in the radial direction, and n is the number of lines of nodes that are provided in the circumferential direction. Here, m and n are integers. Accordingly, the vibration mode illustrated in FIG. 3A is (0,0) mode, that in FIG. 3B is (1,0) mode, that in FIG. 3C is (0,2) mode, and that in FIG. 3D is (1,2) mode. The vibration mode may be such that m is 2 or greater and n is 3 or greater.

As described above, to vibrate the light transmitting body unit 22 in (m,n) mode in which n is 1 or greater, adjacent regions of the tubular piezoelectric vibrator 14 may be polarized in different directions. For example, as illustrated in FIG. 5A, regions of the piezoelectric vibrator 14 on one side and the other side of a center line S1, which extends through the center of the piezoelectric vibrator 14 in a radial direction, may be polarized in opposite thickness directions, as indicated by the signs + and −. Alternatively, as illustrated in FIG. 5B, four regions defined by the center line S1 and a center line S2 orthogonal or substantially orthogonal to the center line S1 may be polarized such that adjacent regions are polarized in opposite thickness directions.

Figure 5B:
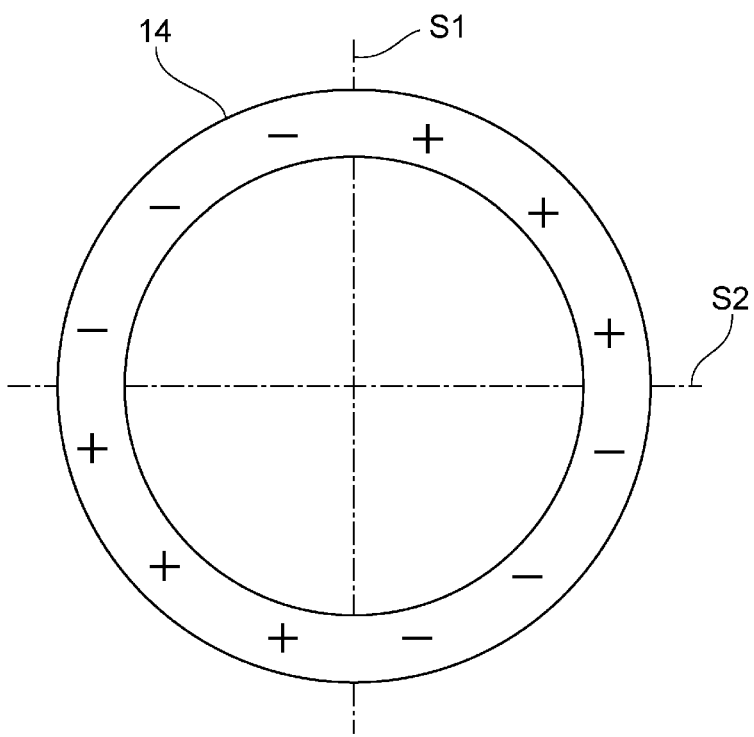

In the case in which the piezoelectric vibrator 14 has a polarization structure illustrated in FIG. 5A or 5B, electrodes may be provided on both surfaces of the piezoelectric vibrator 14 over the entire or substantially the entire areas thereof. Assuming that the polarization structure is that illustrated in FIG. 5B, vibration in (0,2) mode or (1,2) mode is able to be effectively excited by applying an alternating voltage across the electrodes on both surfaces.

Figure 6A:
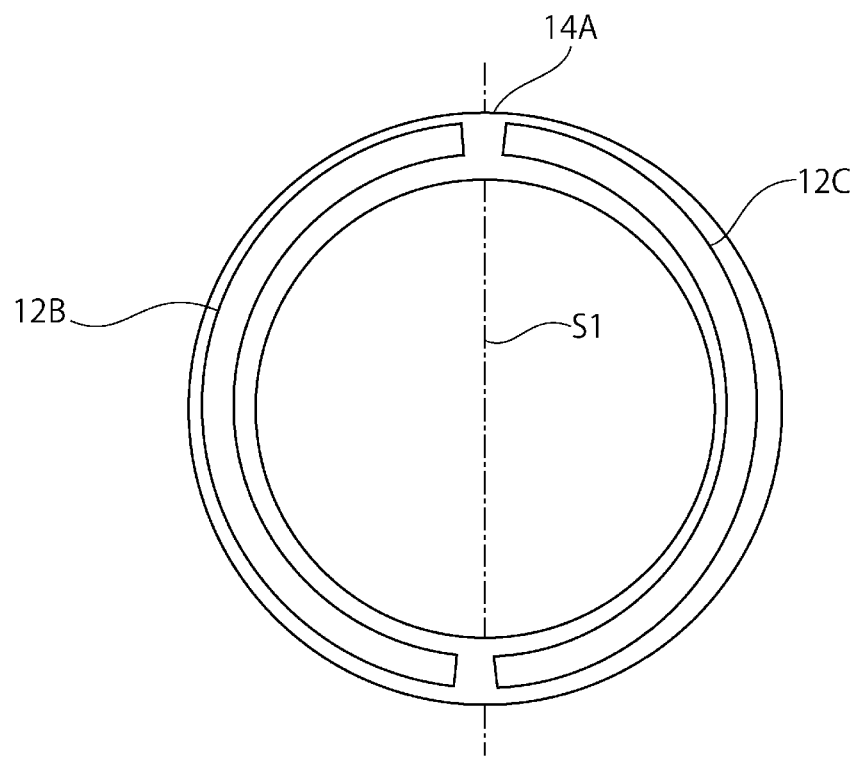

Alternatively, as illustrated in FIG. 6A, an excitation electrode 12B and an excitation electrode 12C may be provided on a tubular piezoelectric body 14A in regions on one side and the other side, respectively, of the center line S1. In this case, the piezoelectric body may be uniformly polarized in the thickness direction. Electrodes may also be provided on the back surface of the tubular piezoelectric body 14A in regions on one side and the other side of the center line S1 in a similar manner. Then, the regions on one side and the other side of the center line S1 may be driven by voltages in opposite phases.

Figure 6B:
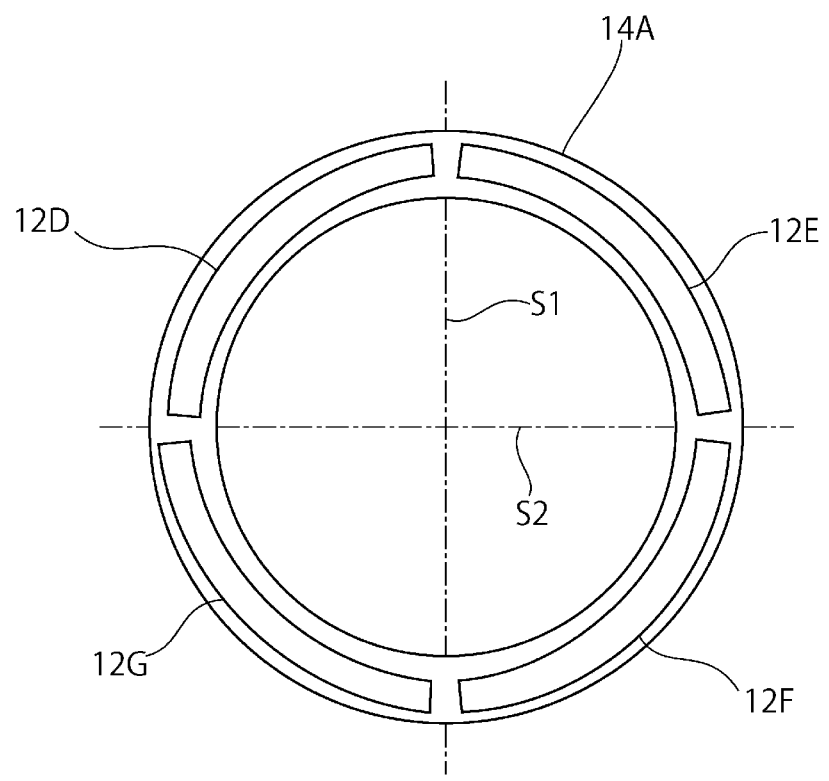

Furthermore, instead of establishing the state of polarization illustrated in FIG. 5B, as illustrated in FIG. 6B, first to fourth excitation electrodes 12D to 12G may be provided in regions surrounded by the center lines S1 and S2. Also in this case, fifth to eighth excitation electrodes are provided on the opposite surface so that the fifth to eighth excitation electrodes oppose the first to fourth excitation electrodes 12D to 12G. Also in this case, the tubular piezoelectric body is able to be uniformly polarized in the thickness direction. Then, the adjacent regions may be driven by voltages in opposite phases.

In the case in which a plurality of electrodes are arranged on the piezoelectric vibrator 14 in the circumferential direction so that different electrodes are disposed in regions adjacent to each other in the circumferential direction, insulating layers may be provided between the piezoelectric vibrator 14 and the tubular member 13 and between the piezoelectric vibrator 14 and the mode changing coupler 21 to prevent short-circuiting between the electrodes along the tubular member 13 or the mode changing coupler 21.

The operation of the vibrating device according to the present preferred embodiment will now be described assuming that, as illustrated in FIG. 5A, the regions of the piezoelectric vibrator 14 on one side and the other side of the center line S1, which extends through the center of the piezoelectric vibrator 14 in the radial direction, are polarized in opposite thickness directions, as indicated by the signs + and −. Other structures are the same as or similar to those described above. When the piezoelectric vibrator 14 is driven, the mode changing coupler 21 changes the vibration mode, and transmits the vibration to the light transmitting body unit 22.

When the driving frequency is set to a frequency corresponding to the mode illustrated in FIG. 3C, water droplets are not affected in regions in which the vibration displacement is small (regions corresponding to vibration nodes). In regions in which the vibration displacement is large (regions corresponding to vibration antinodes), water droplets are atomized due to the vibration. When there is a water droplet that extends between a region in which the vibration displacement is large to a region in which the vibration displacement is small, the water droplet moves toward the region in which the vibration displacement is large (region corresponding to a vibration antinode) due to a difference in contact angle. Since the water droplet moves to the region in which the vibration displacement is large (region corresponding to a vibration antinode), the water droplet is atomized and removed from the light transmitting body unit 22.

The regions in which the vibration displacement is large (regions corresponding to vibration antinodes) may be located in a second region, which corresponds to a region outside the field-of-view section, by appropriately designing the structure, the frequency, or the vibration mode to be used. In other words, liquid droplets in the field-of-view section may be moved out of the field-of-view section, and atomized in the region outside the field-of-view section. Thus, even when the liquid droplets include impurities, residues do not remain in the field-of-view section. As a result, a clear field of view is able to be provided.

In the vibrating device 2, the tubular piezoelectric vibrator 14 includes a plurality of vibration regions arranged in the circumferential direction thereof, and is structured so that among the vibration regions, vibration regions that are adjacent to each other are able to be vibrated in opposite phases. When the tubular vibrating body 12 is vibrated, the light transmitting body unit 22 is vibrated in a first vibration mode in which vibration nodes are in the first region of the light transmitting body unit 22, the first region corresponding to the field-of-view section of the camera 1, and vibration antinodes are in the second region of the light transmitting body unit 22, the second region corresponding to the region outside the field-of-view section of the camera 1.

More specifically, when the light transmitting body unit 22 is vibrated in the first vibration mode, vibration nodes are provided in the first region of the light transmitting body unit 22, the first region being surrounded by the broken line A in FIG. 1, and vibration antinodes are provided in the second region, which is outside the first region.

Accordingly, during vibration in the first vibration mode, a water droplet B illustrated in FIG. 1 moves out of the field-of-view section as shown by the arrow. More specifically, the contact angle of the water droplet B with respect to the surface of the light transmitting body unit 22 decreases, and the water droplet B spreads along the surface of the light transmitting body unit 22. Also, the water droplet B easily moves along the surface of the light transmitting body unit 22. This will be described in more detail below with reference to FIGS. 8A to 8C.

In the camera 1 according to the present preferred embodiment, when one of the lenses 9 that is at the front end of the camera main body 3 is viewed from the light transmitting body unit 22 in the above-described first vibration mode, nodes in the first vibration mode are preferably in the region in which the light transmitting body unit 22 and the lens 9 overlap. In such a case, the water droplet B is able to be more reliably moved out of the field-of-view section.

In addition, the vibrating device 2 is also capable of vibrating the light transmitting body unit 22 at an amplitude greater than that in the first vibration mode to atomize the water droplet B that has moved out of the field-of-view section along the light transmitting body unit 22. Thus, the light transmitting body unit 22 is preferably vibrated in a second vibration mode to atomize the water droplet B after vibrating the light transmitting body unit 22 in the first vibration mode.

A method for driving the vibrating device 2 according to a preferred embodiment of the present invention to remove the water droplet B will now be described in detail.

When (0,2) mode or (1,2) mode is used, the water droplets or other substances are caused to move from the vibration nodes toward the vibration antinodes, and then are removed by being atomized. Referring to FIGS. 3C and 3D, the central section of the light transmitting body unit defines a vibration node. Therefore, the water droplets or other substances move toward the outer peripheral section of the light transmitting body unit. Thus, the clarity of the field of view of the camera main body 3 is able to be improved in the central section.

Figure 7A:
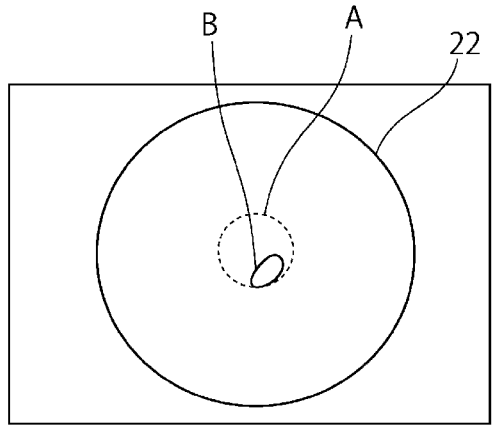

Assume that the water droplet B has adhered to the light transmitting body unit 22 as illustrated in FIG. 1. In this case, as illustrated in FIG. 7A, which is a schematic front view of the light transmitting body unit 22, the water droplet B on the light transmitting body unit 22 is in the region surrounded by the broken line A, that is, in the region corresponding to the field-of-view section.

Figure 7D:
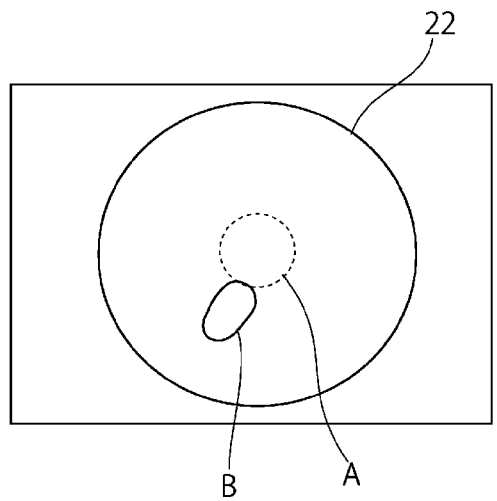
Figure 7B:
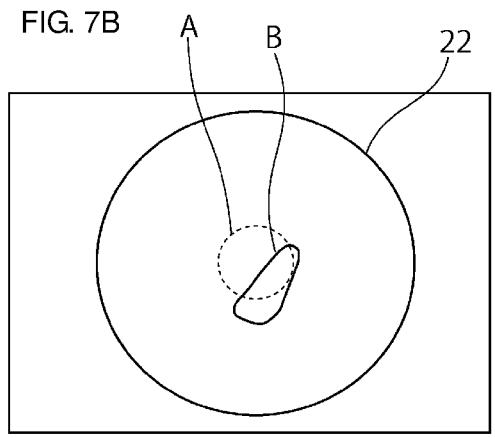

In this state, the light transmitting body unit 22 is vibrated in the first vibration mode. As a result, as illustrated in FIG. 7B, the contact angle of the water droplet B with respect to the surface of the light transmitting body unit 22 is reduced, and the water droplet B spreads. Although the water droplet B spreads from the first region, which corresponds to the field-of-view section, into a region outside the first region in FIG. 7B, the water droplet B may instead be present only in the first region that corresponds to the field-of-view section.

Figure 7E:
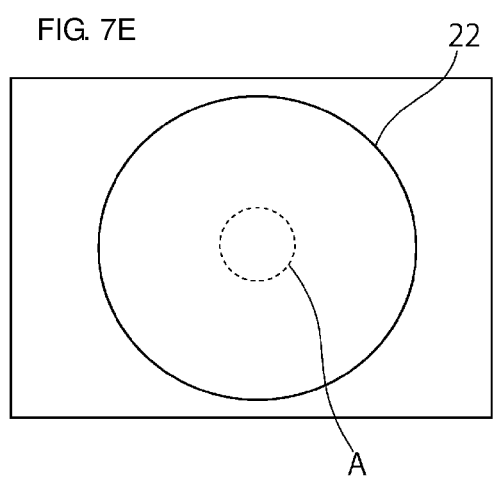
Figure 7C:
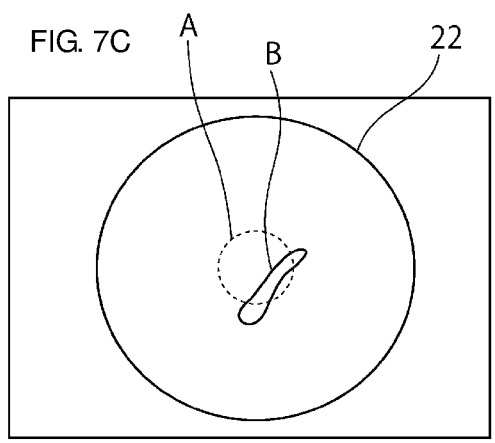

The light transmitting body unit 22 is continuously vibrated in the first vibration mode. As a result, as illustrated in FIGS. 7C and 7D, the water droplet B moves out of the first region surrounded by the broken line A. This is because when the water droplet B is disposed so as to extend between a vibration node and a vibration antinode, the surface tension applied to the water droplet B differs between one side and the other side of the vibration node. This will be further described with reference to FIGS. 8A to 8C.

Figure 8A:
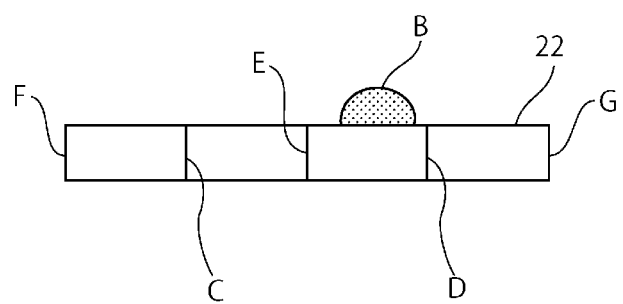
Figure 8B:
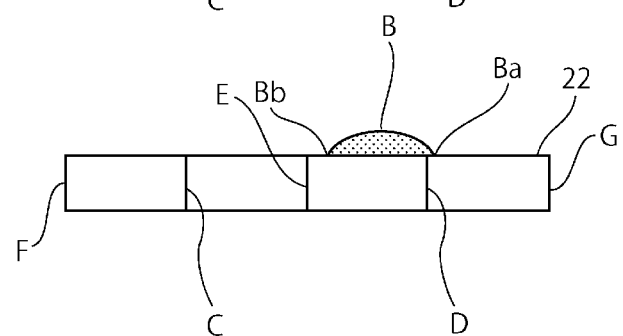
Figure 8C:
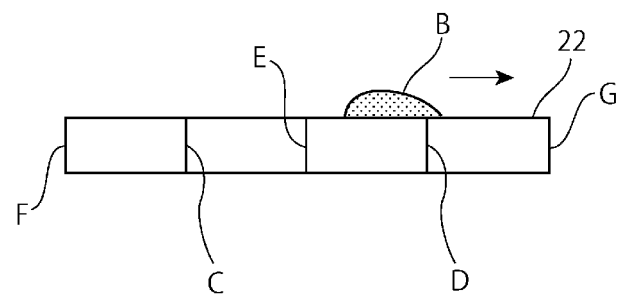

FIG. 8A is a schematic side view of a portion of the light transmitting body unit 22 shown as a plate-shaped member. Referring to FIGS. 8A to 8C, a vibration node E is at the center of the light transmitting body unit 22, and vibration antinodes F and G are at the end surfaces of the light transmitting body unit 22. Vibration is small in the region between C and D. Vibration is larger in the region between C and the vibration antinode F than in the region between C and D. Also, vibration is larger in the region between D and the vibration antinode G than in the region between C and D.

Assume that the light transmitting body unit 22 is vibrated in the first vibration mode. The water droplet B in FIG. 8B, for example, extends beyond the boundary D between the region in which vibration is small and the region in which vibration is large. Therefore, the surface tension applied to the water droplet B by the light transmitting body unit 22 differs between one end Ba and the other end Bb. Accordingly, as shown by the arrow in FIG. 8C, the water droplet B moves toward the periphery of the light transmitting body unit 22.

The water droplet B does not necessarily extend beyond the position indicated by C or D. Since the amplitude continuously changes from the positions indicated by F and G to the node E, the surface tension applied to the water droplet B illustrated in FIG. 8A by the light transmitting body unit 22 also greatly differs between one end Ba that is near the node G and the other end Bb that is near the node E. Accordingly, the water droplet B illustrated in FIG. 8A moves so as to extend beyond D, as illustrated in FIG. 8B. Then, when the water droplet B extends beyond D as illustrated in FIG. 8B, the difference in surface tension between the one end Ba and the other end Bb increases, so that the water droplet B quickly moves from the position illustrated in FIG. 8B toward the periphery of the light transmitting body unit 22, as shown by the arrow in FIG. 8C.

In the manner described above, as illustrated in FIG. 7D, the water droplet B moves out of the first region, which corresponds to the field-of-view section.

After that, as described above, the first vibration mode is continuously set, but the amplitude is increased so that the water droplet B that has moved out of the field-of-view section is atomized. In this case, the atomization occurs at the vibration antinodes. The amplitude is able to be increased by increasing the driving voltage applied to the piezoelectric vibrator 14 to drive the tubular vibrating body 12. As a result, as illustrated in FIG. 7E, the water droplet B on the surface of the light transmitting body unit 22 is able to be dissipated. Thus, the vibrating device 2 is capable of reliably removing water droplets or other substances on the light transmitting body unit 22, in particular, in the field-of-view section.

Since the outer peripheral portion of the light transmitting body unit 22 is fixed, the first vibration mode is preferably set to (1,2) mode, for example. In addition, (0,2) mode, (1,1) mode, and (0,1) mode are also preferred. In this case, the contact angle of the water droplet B on the light transmitting body unit 22 with respect to the surface of the light transmitting body unit 22 is able to be effectively reduced.

In this driving method, two different modes are used. First, the vibrating device 2 is driven in (1,0) mode illustrated in FIG. 3B (first vibration mode). Accordingly, the water droplets or other substances move from the vibration nodes toward the vibration antinodes. Next, the vibrating device 2 is driven in (0,0) mode illustrated in FIG. 3A (second vibration mode). Since no vibration nodes are generated in (0,0) mode, the amplitude is greater in this mode than in other modes. Accordingly, the water droplets are atomized.

The second vibration mode is able to be excited as follows. That is, when the regions of the tubular piezoelectric vibrator 14 that are adjacent to each other in the circumferential direction are all polarized in the same direction, voltages in the same phase may be applied thereto. As another method, when a plurality of separate electrodes are arranged in the circumferential direction, voltages in the same phase may be applied to the adjacent electrodes while alternately inverting the phase thereof. As another method, when the regions of the tubular piezoelectric vibrator that are adjacent to each other in the circumferential direction are alternately polarized in opposite thickness directions and when a plurality of separate electrodes are provided, voltages whose phases are alternately inverted may be applied.

The substance that adheres to the camera may be a solution other than water, such as ethanol, an aqueous solution of salt, an antifreezing agent (calcium chloride), etc., droplets of liquid containing water insoluble impurities, such as mud water, or a colloidal solution, such as coffee (hereinafter referred to as liquid droplets). Even in such a case, as a result of an operation and phenomenon similar to those described above, the substance is able to be moved out of the first region, which corresponds to the field-of-view section, and atomized in the region outside the first region while the contents are dissolved therein. Thus, the water droplets that have adhered to the outer surface of the light transmitting body unit 22 are able to be removed. This operation differs from evaporation, and the liquid droplets are able to be removed together with the solutes/impurities contained therein without causing deposition of the solutes/impurities.

First and second experimental examples performed by using the vibrating device according to the first preferred embodiment will now be described.

The results of the first experimental example will now be described. The tubular vibrating body unit 12, the mode changing coupler 21, and the light transmitting body unit 22 used in the first experimental example had the following dimensions.

Dimensions of the tubular vibrating body unit 12: inner diameter about 8.0 mm, outer diameter about 18.0 mm, and length about 16.0 mm. Dimensions of the mode changing coupler 21: inner diameter about 8.0 mm, outer diameter about 18.0 mm, and length about 5.7 mm. Dimensions of the light transmitting body unit 22: spherical inner diameter about 8.0 mm, and thickness about 1.0 mm.

Figure 13:
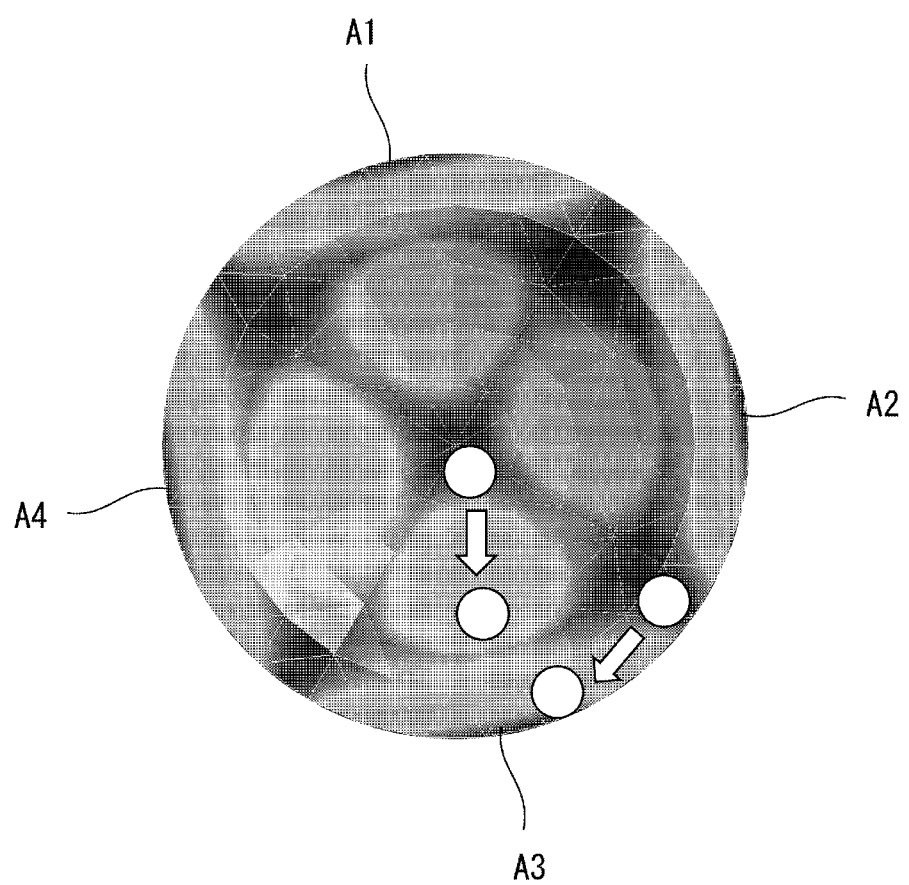
FIG. 13 illustrates a displacement distribution in a vibration mode used in an exemplary experiment performed on the vibrating device according to the first preferred embodiment of the present invention.
Figure 14A:
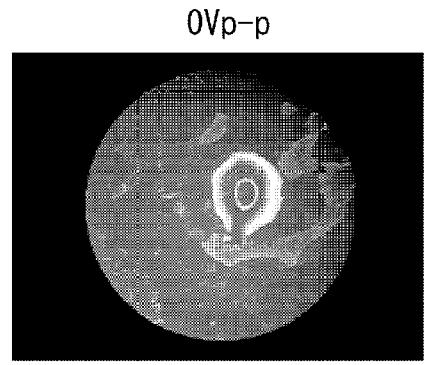
FIGS. 14A to 14D are schematic diagrams illustrating driving voltages and the states of water droplets in an exemplary experiment performed on the vibrating device according to the first preferred embodiment of the present invention.
Figure 14B:
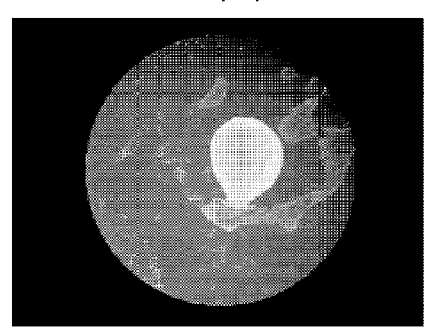
Figure 14C:
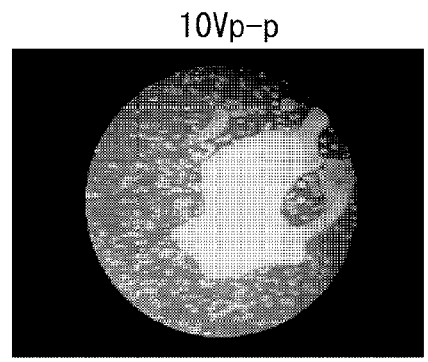
Figure 14D:
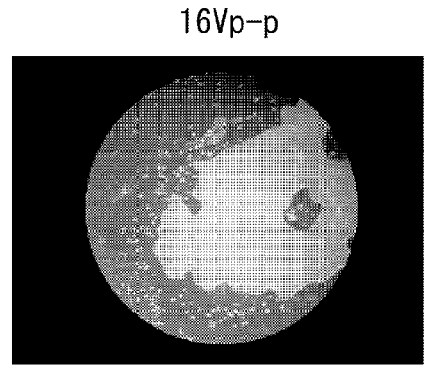

Small droplets of about 0.4% salt water (aqueous solution obtained by dissolving about 14 g of NaCl into about 1 L of water) were dropped onto the light transmitting body unit 22, and were continuously atomized. More specifically, about 15 ml of the salt water was dripped in one hour. The driving frequency was set to about 146 kHz in the atomization operation. The driving voltage was gradually swept from about 0 Vp-p to about 16 Vp-p. The vibration mode was set to (1,2) mode. FIG. 13 shows the displacement distribution in the vibration mode. In FIG. 13, the regions denoted by A1 to A4 are regions in which the displacement is at a maximum. In other dark-colored regions, the displacement is smaller than that in the light-colored regions. In the schematic diagram, the white blank circles represent water droplets. As shown by the arrows, the water droplets move from the regions in which the displacement is small to the regions in which the displacement is large. FIGS. 14A to 14D show the driving voltages and the states of water droplets. FIGS. 14A to 14D show the states of water droplets when the driving voltage is about 0 V, about 4 V, about 10 V, and about 16 V, respectively. As illustrated in FIG. 14C, when the driving voltage is about 10 Vp-p, the contact angles of the water droplets or other substances start to change, and therefore the water droplets or other substances start to move. Then, when the driving voltage is about 16 Vp-p, atomization starts, as illustrated in FIG. 14D. Since the driving voltage is swept as described above, the driving voltage required in the atomization operation is lower than that in the case in which the water droplets are not moved. In the experiment, the aqueous solution was moved out of the first region and then atomized without causing deposition of NaCl included in the salt water, and was thus successfully removed.

A similar experiment was performed by using colloidal solutions, such as coffee, and solutions other than water, such as ethanol. Also when these solutions were used, the solutions on the outer surface of the light transmitting body unit 22 were moved and atomized without causing deposition of the contents thereof on the light transmitting body unit 22, and were thus successfully removed.

Even when the liquid droplets include water insoluble impurities, such as mud, the liquid droplets including impurities in the field of view are able to be moved out of the first region together with the impurities included therein as a result of an operation and phenomenon similar to those described above. In addition, when the device is installed so as to face in an appropriate direction (downward), the water droplets or other substances on the outer surface of the light transmitting body unit 22 are able to be removed by atomizing the water droplets together with the water insoluble impurities, or by collecting small liquid droplets in the region outside the first region and causing them to combine into larger liquid droplets that fall due to their own weight. When there is a large amount of impurities or when the size of the impurities is large, the impurities may remain on the light transmitting body unit 22. However, such residues fall due to their own weight and vibration generated in the light transmitting body unit 22. Furthermore, since the impurities remain in the region outside the field of view, there is no risk that the impurities will reduce the clarity of the field of view in the light transmitting body unit 22.

The result of the second experimental example will now be described. The dimensions of the tubular vibrating body unit 12, the mode changing coupler 21, and the light transmitting body unit 22 used in the second experiment example were the same or substantially the same as those in the first experiment example.

The device was arranged to face downward at an angle of about 45° from the horizontal direction, and small droplets of liquid obtained by dispersing about 10 g of ordinary soil in about 90 ml of water were dropped onto the light transmitting body unit 22 and continuously atomized. More specifically, about 15 ml of the liquid was dripped in one hour. The liquid droplets were moved out of the field of view together with the impurities included therein. After that, impurities having small particle diameters were removed from the outer surface of the light transmitting body unit 22 by being atomized together with water or when large liquid droplets into which the liquid droplets collected in the region outside the first region were combined fell due to their own weight. Although impurities having large particle diameters remained on the light transmitting body unit 22, the remaining impurities were in the region outside the field of view. Therefore, the camera function was not adversely affected.

Also, after a certain time, the impurities fell and were removed from the outer surface of the light transmitting body unit 22.

Figure 9:
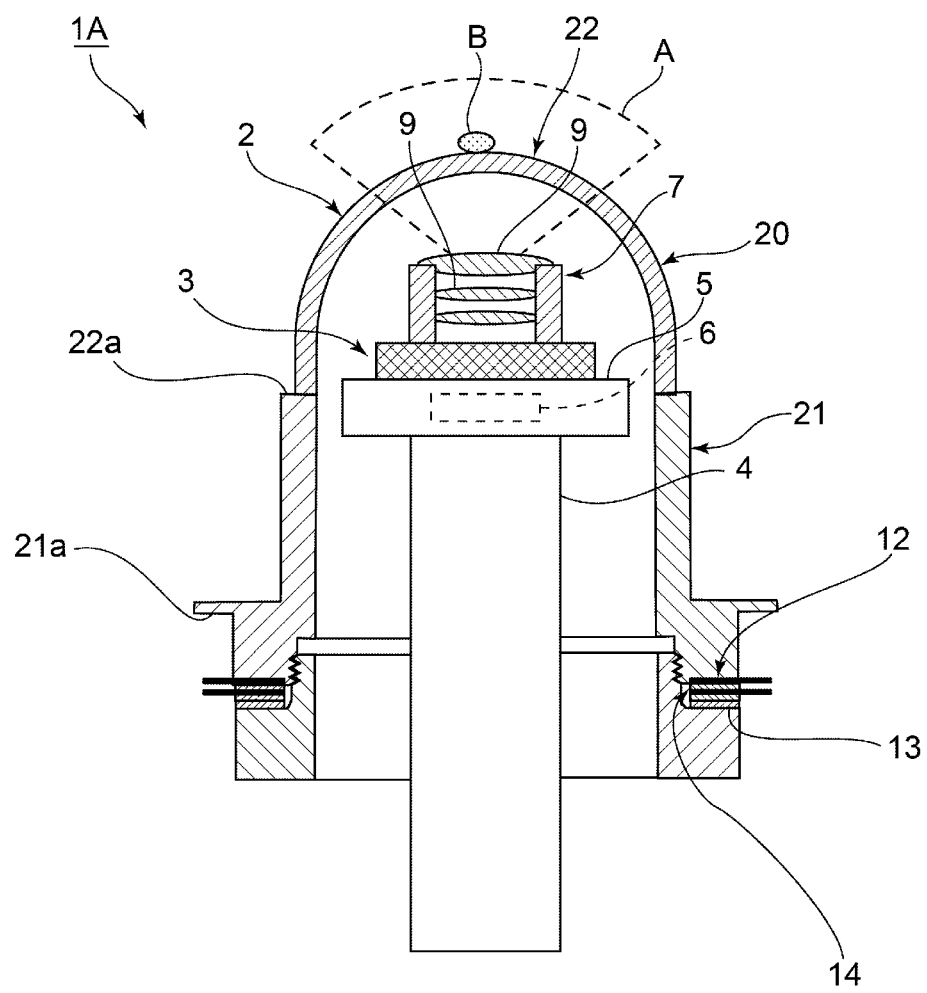

FIG. 9 is a front sectional view of a camera 1A according to a second preferred embodiment of the present invention. The camera 1A includes a portion corresponding to the lens cover 20 including the light transmitting body unit 22 and a portion corresponding to the mode changing coupler 21, and these portions are preferably made of the same material and integrated together. The camera 1A is similar to the camera 1 in other respects. Thus, the mode changing coupler 21 and the lens cover 20 may be integrated together. Also in this case, similar to the camera 1, since the vibrating device 2 is provided, the water droplet B that has adhered to the light transmitting body unit 22 in the region corresponding to the field of view of the camera is able to be easily and reliably removed.

In the case in which the mode changing coupler 21 and the lens cover 20 are integrated together, the (m,n) mode is excited at a position in which the mode changing coupler 21 and the lens cover 20 are integrated together. Therefore, vibration antinodes are able to be easily positioned outside the region corresponding to the field of view of the camera 1A.

In the structure of the first preferred embodiment, the mode changing coupler 21 and the light transmitting body unit 22 do not necessarily include the flange portions 21b and 22a. More specifically, the mode changing coupler 21 and the light transmitting body unit 22 that are separate members and that do not include the flange portions 21b and 22a may be joined together. In this case, the (m,n) mode may be excited as if the mode changing coupler 21 and the light transmitting body unit 22 are integrated together. Therefore, vibration antinodes are able to be easily positioned outside the region corresponding to the field-of-view section of the camera 1A.

In the first preferred embodiment, the lens cover 20 includes the mode changing coupler 21. However, as in a third preferred embodiment of the present invention illustrated in FIG. 10, a lens cover 20A may include only a dome-shaped light transmitting body unit 22. In this case, the lens cover 20A includes the dome-shaped light transmitting body unit 22, and is directly fixed to the tubular vibrating body 12.

Figure 11:
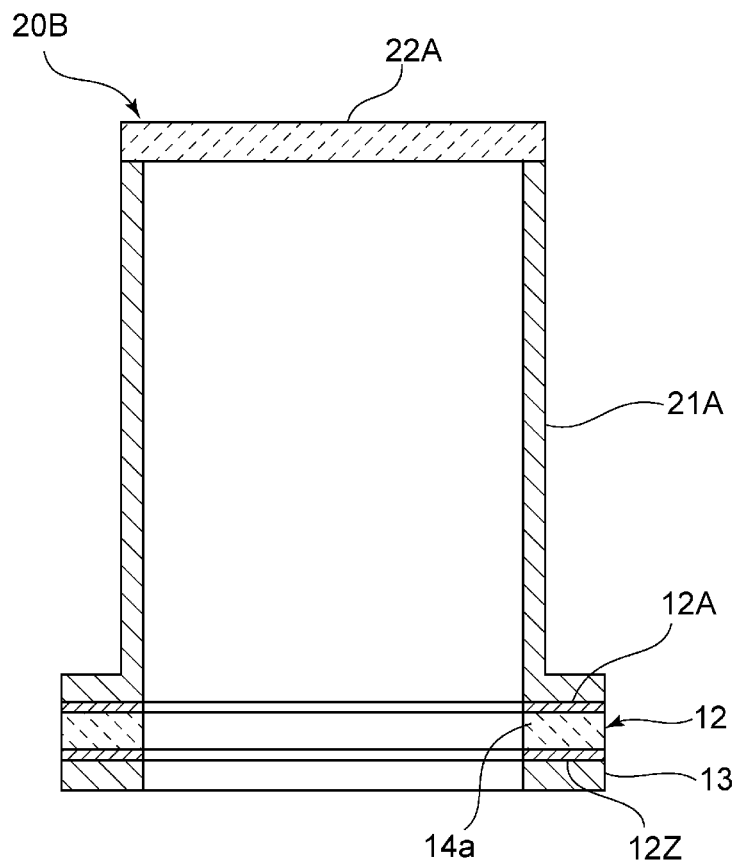
FIG. 11 is a front sectional view illustrating the relationship between a lens cover and a piezoelectric vibrator according to a fourth preferred embodiment of the present invention.

Alternatively, as in a fourth preferred embodiment of the present invention illustrated in FIG. 11, a cylindrical lens cover 20B may preferably be provided instead of a dome-shaped lens cover. The lens cover 20B includes a cylindrical member 21A and a flat plate-shaped light transmitting body unit 22A fixed to the front end of the cylindrical member 21A. The lens cover 20B is directly fixed to the tubular vibrating body 12.

Figure 10:
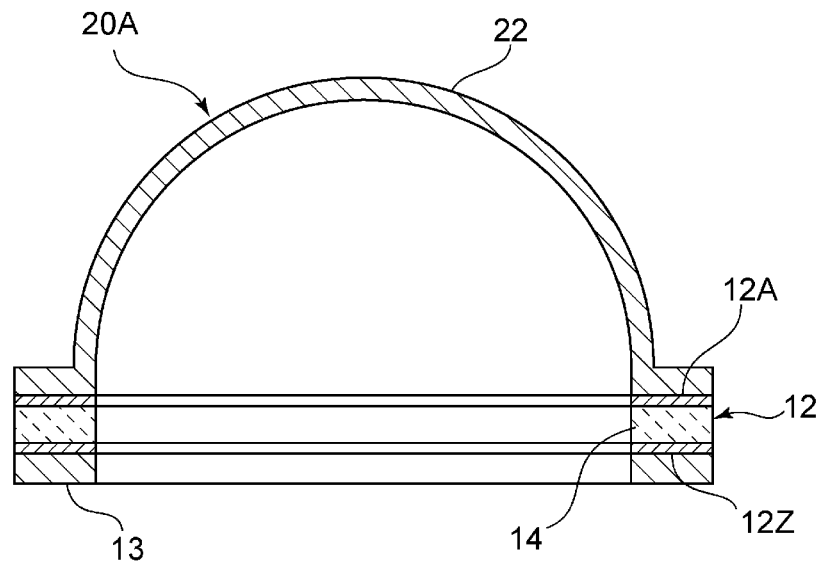

The lens covers 20A and 20B illustrated in FIGS. 10 and 11 clearly show that the shape of the lens cover according to the present invention is not particularly limited.

Figure 12:
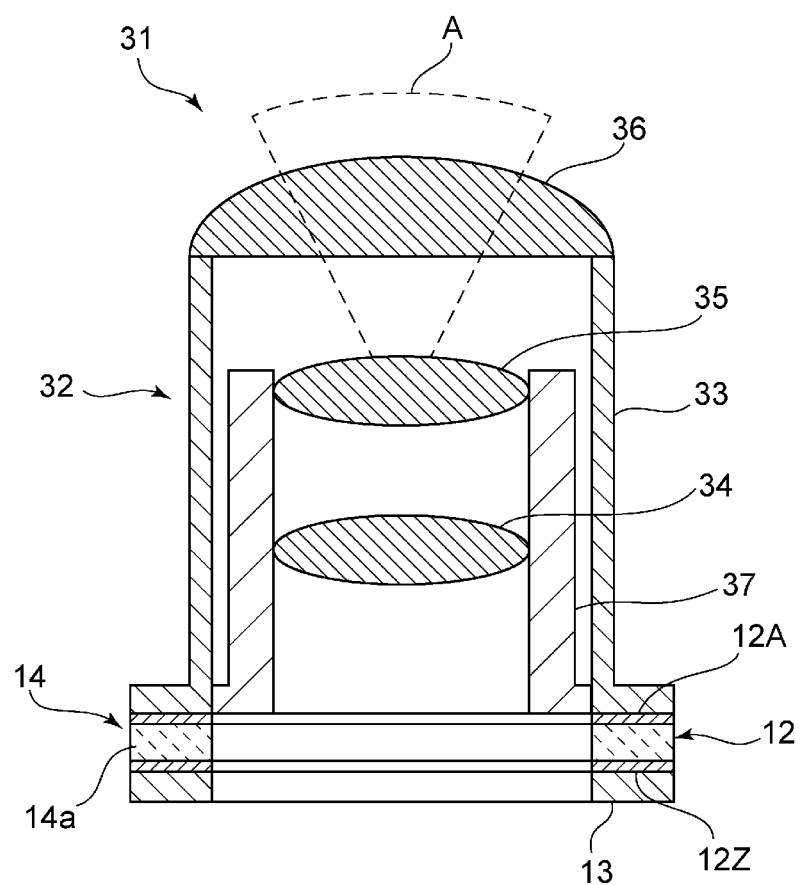
FIG. 12 is a front sectional view illustrating the relationship between a lens module and a piezoelectric vibrator in a camera according to a fifth preferred embodiment of the present invention.

FIG. 12 illustrates the relationship between a lens module 32 and piezoelectric vibrators 14 included in a camera 31 according to a fifth preferred embodiment of the present invention. In the present preferred embodiment, the lens module 32 is fixed to a tubular vibrating body 12. In the camera 31 according to the present preferred embodiment, the lens module 32 is provided in place of the lens cover 20 and the lens module 7 included in the camera 1 illustrated in FIG. 1. Although not illustrated in FIG. 12, the lens module 32 may be replaced by the lens module 7 of the camera main body 3 illustrated in FIG. 1. Thus, the camera 31 also includes a camera main body including the lens module 32.

The lens module 32 includes a tubular housing 33. The tubular housing 33 accommodates lenses 34 and 35. The lenses 34 and 35 are disposed in a tubular support member 37. A lens 36 at the front end is disposed at the front of the tubular housing 33. The lens 36 is fixed to the tubular housing 33 so as to cover an opening in the tubular housing 33. Thus, in the lens module 32, only the outer surface of the lens 36 at the front end is exposed to the outside. Also in this case, when water droplets or other substances adhere to the outer surface of the lens 36 in the first region, which is shown by the broken line A and corresponds to the field-of-view section of the camera 31, similar to the first preferred embodiment, the water droplets may be removed by causing the water droplets to spread and move out of the field of view and atomizing the water droplets by vibrating the tubular vibrating body 12.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vibrating device for a camera including a lens, the vibrating device comprising:
    a tubular vibrating body including a first surface, a second surface that is opposite the first surface, and a side wall portion that connects the first and second surfaces, the first and second surfaces including openings; and
    a lens cover covering one of the openings in the tubular vibrating body; wherein
    the tubular vibrating body includes a tubular member and a piezoelectric vibrator fixed to the tubular member;
    the lens cover includes a tubular mode changing coupler coupled to the tubular vibrating body and a light transmitting body unit joined to the mode changing coupler at a side opposite to a side at which the tubular vibrating body is coupled, the light transmitting body unit including a light transmitting portion disposed in front of the lens; and
    the mode changing coupler includes a thin portion having a thickness smaller than a thickness of the tubular member.

2. The vibrating device according to claim 1, wherein, when the tubular vibrating body is vibrated, the tubular vibrating body vibrates the light transmitting body unit in a first vibration mode in which the light transmitting body unit includes a vibration node in a first region of the light transmitting body unit, the first region corresponding to a field-of-view section of the camera, and a vibration antinode in a second region of the light transmitting body unit, the second region being positioned outside the field-of-view section of the camera.

3. The vibrating device according to claim 2, wherein, when the lens of the camera is viewed from the light transmitting body unit in the first vibration mode, a node of the first vibration mode is provided on the light transmitting body unit in a region that overlaps the lens.

4. The vibrating device according to claim 2, wherein the tubular vibrating body vibrates the light transmitting body unit in a second vibration mode in which a water droplet or other substance is atomized in the second region of the light transmitting body unit.

5. The vibrating device according to claim 4, wherein an amplitude in the second vibration mode is greater than an amplitude in the first vibration mode.

6. A method for driving the vibrating device according to claim 2, the method comprising:
- a step of moving a water droplet or other substance that has adhered to the light transmitting body unit in the first region to the second region outside the field-of-view section of the camera by vibrating the light transmitting body unit in the first vibration mode; and
- a step of atomizing the water droplet moved to the second region of the light transmitting body unit.

7. The method for driving the vibrating device according to claim 6, wherein, in the atomizing step, the water droplet or other substance moved to the second region of the light transmitting body unit is atomized by vibrating the light transmitting body unit in the second vibration mode.

8. The vibrating device according to claim 1, wherein a plurality of the piezoelectric vibrators are provided in a circumferential direction of the tubular member so that the light transmitting body unit includes a plurality of vibration regions when the tubular vibrating body is vibrated, and among the vibration regions, vibration regions that are adjacent to each other vibrate in opposite phases.

9. The vibrating device according to claim 1, wherein the piezoelectric vibrator extends in a circumferential direction of the tubular member and is polarized in a thickness direction of the piezoelectric vibrator non-uniformly in the circumferential direction so that the light transmitting body unit includes a plurality of vibration regions when the tubular vibrating body is vibrated, and among the vibration regions, vibration regions that are adjacent to each other vibrate in opposite phases.

10. The vibrating device according to claim 1, wherein the lens cover and the lens are spaced from each other.

11. A camera comprising:
- a camera main body including a lens module; and
- the vibrating device according to claim 1; wherein
- the lens module is disposed in the lens cover.

12. The camera according to claim 11, wherein, when the tubular vibrating body is vibrated, the tubular vibrating body vibrates the light transmitting body unit in a first vibration mode in which the light transmitting body unit includes a vibration node in a first region of the light transmitting body unit, the first region corresponding to a field-of-view section of the camera, and a vibration antinode in a second region of the light transmitting body unit, the second region being positioned outside the field-of-view section of the camera.

13. The camera according to claim 12, wherein, when the lens of the camera is viewed from the light transmitting body unit in the first vibration mode, a node of the first vibration mode is provided on the light transmitting body unit in a region that overlaps the lens.

14. The camera according to claim 12, wherein the tubular vibrating body vibrates the light transmitting body unit in a second vibration mode in which a water droplet or other substance is atomized in the second region of the light transmitting body unit.

15. The camera according to claim 14, wherein an amplitude in the second vibration mode is greater than an amplitude in the first vibration mode.

16. The camera according to claim 11, wherein a plurality of the piezoelectric vibrators are provided in a circumferential direction of the tubular member so that the light transmitting body unit includes a plurality of vibration regions when the tubular vibrating body is vibrated, and among the vibration regions, vibration regions that are adjacent to each other vibrate in opposite phases.

17. The camera according to claim 11, wherein the piezoelectric vibrator extends in a circumferential direction of the tubular member and is polarized in a thickness direction of the piezoelectric vibrator non-uniformly in the circumferential direction so that the light transmitting body unit includes a plurality of vibration regions when the tubular vibrating body is vibrated, and among the vibration regions, vibration regions that are adjacent to each other vibrate in opposite phases.

18. The camera according to claim 11, wherein the lens cover and the lens are spaced from each other.

\* \* \* \* \*